US012771109B2

(12) United States Patent
Hamasuna

(10) Patent No.: US 12,771,109 B2
(45) Date of Patent: Oct. 20, 2026

(54) BUSBAR CONNECTION STRUCTURE

(71) Applicant: HONDA MOTOR CO., LTD., Tokyo (JP)

(72) Inventor: Ryoma Hamasuna, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 335 days.

(21) Appl. No.: 18/585,072

(22) Filed: Feb. 23, 2024

(65) Prior Publication Data

US 2024/0332937 A1 Oct. 3, 2024

(30) Foreign Application Priority Data

Mar. 29, 2023 (JP) ................................ 2023-053904

(51) Int. Cl.
*H02G 5/08* (2006.01)

(52) U.S. Cl.
CPC .................................... *H02G 5/08* (2013.01)

(58) Field of Classification Search
CPC ....................................................... H02G 5/08
See application file for complete search history.

(56) References Cited

U.S. PATENT DOCUMENTS

2013/0327570 A1* 12/2013 Bhathija .............. H01R 25/162
174/88 R
2021/0242611 A1 8/2021 Yokotani

FOREIGN PATENT DOCUMENTS

| | | | |
|---|---|---|---|
| JP | S57211920 A | 12/1982 |
| JP | H08288019 A | 11/1996 |
| JP | 2004327184 A | 11/2004 |
| JP | 6214024 B2 | 10/2017 |
| JP | 2019220305 A | 12/2019 |

OTHER PUBLICATIONS

Notification of Reasons for Refusal issued Nov. 12, 2024 in the JP Patent Application No. 2023-053904.

* cited by examiner

*Primary Examiner* — Phuong K Dinh
(74) *Attorney, Agent, or Firm* — CKC & PARTNERS CO., LLC

(57) ABSTRACT

The objective is to suppress the spread of noise without installing a dedicated noise suppression component around the connection parts of busbars. A busbar connection structure includes a connection part and a cover. The connection parts electrically connect a first busbar, which is connected to the circuit of the first device, and a second busbar, which is connected to the circuit of the second device. The cover is for preventing contamination, covering the area including the connection parts. The cover includes a conductive part as a region of a conductor, at least over a range including directly above the connection parts.

11 Claims, 6 Drawing Sheets

<FIRST COMPARATIVE EMBODIMENT>

<SECOND COMPARATIVE EMBODIMENT>

<PRESENT EMBODIMENT>

BUSBAR CONNECTION STRUCTURE

This application is based on and claims the benefit of priority from Japanese Patent Application No. 2023-053904, filed on 29 Mar. 2023, the content of which is incorporated herein by reference.

BACKGROUND OF THE INVENTION

Field of the Invention

The present invention relates to a busbar connection structure that electrically connects busbars.

Related Art

Some busbar connection structures electrically connect a first busbar, which is electrically connected to the circuit of a first device, and a second busbar, which is electrically connected to the circuit of a second device.

Patent Document 1: Japanese Patent No. 6214024

SUMMARY OF THE INVENTION

The inventors have focused on the following problems in such busbar connection structures. The first and second busbars being exposed outside the device are prone to high parasitic inductance. This parasitic inductance, together with the busbar current flowing through the first and second busbars, can generate magnetic flux, which poses a risk of spreading noise to peripheral devices.

As a countermeasure, it is conceivable to install a dedicated noise suppression component, such as parallel plates, around the connection part of the busbars. With this measure, eddy currents are generated in the parallel plates due to the magnetic flux caused by the busbar current. The magnetic flux caused by the eddy currents cancels out at least part of the magnetic flux caused by the busbar current. This suppresses the generation of magnetic flux, and thus suppresses the spread of noise.

However, in certain cases, such as when the first and second devices are purchased from different suppliers, it may be difficult to install such a dedicated noise suppression component around the connection part. Furthermore, in environments with a high level of contamination due to dust or the like, it may be necessary to attach a contamination prevention cover to the first and second busbars. In this case, interference with the cover may hinder the installation of a dedicated noise suppression component.

The present invention has been made in view of the above circumstances with the objective to suppress the spread of noise without installing a dedicated noise suppression component around the connection part of the busbars.

The present inventors have made the present invention by finding that the above objective can be achieved by providing a conductor in the contamination prevention cover that covers the first and second busbars. The present invention is a busbar structure as described below in (1) to (6).

(1) A busbar connection structure including: a connection part that electrically connects a first busbar, which is electrically connected to a circuit of a first device, and a second busbar, which is electrically connected to a circuit of a second device; and a cover for preventing contamination, covering a range including the connection part, in which the cover includes a conductive part as a region of a conductor, at least over a range including directly above the connection part.

With this configuration, eddy currents are generated in the conductive part due to the magnetic flux caused by the busbar current flowing through the first and second busbars. The magnetic flux generated by the eddy currents cancels out at least part of the magnetic flux caused by the busbar current. This suppresses the generation of magnetic flux, and thus suppresses the spread of noise. Moreover, since the conductive part is part of the contamination prevention cover, there is no need to install a dedicated noise suppression component.

Thus, this configuration allows for suppressing the spread of noise without installing a dedicated noise suppression component around the connection part of the busbars.

(2) The busbar connection structure as described above in (1), in which the first busbar and the second busbar exist in a plurality of numbers, and the connection parts are aligned in a predetermined direction, and the cover includes, as the conductive part, an upper conductive part over a range including directly above the connection parts, and side conductive parts covering the ranges on both sides sandwiching the connection parts in the predetermined direction.

With this configuration, eddy currents are also generated in the side conductive parts in addition to the upper conductive part, due to the magnetic flux caused by the busbar current. The magnetic flux generated by the eddy currents cancels out part of the magnetic flux caused by the busbar current. As a result, the generation of magnetic flux is more robustly suppressed, and thus the spread of noise is more robustly suppressed.

(3) The busbar connection structure as described above in (2), in which the side conductive parts protrude downward from the upper conductive part, and the upper conductive part and the side conductive parts are electrically connected to each other.

With this configuration, magnetic flux and currents can move between the upper and side conductive parts, leading to an expected improvement in noise suppression effects.

(4) The busbar connection structure as described above in (2) or (3), in which the upper conductive part and the side conductive parts are each covered with an insulator.

This configuration ensures insulation between the conductive parts and each busbar, and also ensures insulation between the busbars aligned in the predetermined direction.

(5) The busbar connection structure as described above in any one of (1) to (3), in which the conductive part is grounded by being electrically connected to a reference potential part that is external to the cover.

With this configuration, currents can move between the conductor and the reference potential part, leading to an expected improvement in noise suppression effects.

(6) The busbar connection structure as described above in any one of (1) to (3), in which at least one of the first device and the second device is a transformer or an inverter.

Transformers and inverters, which handle large currents and control semiconductor switches by duty cycle, are prone to significant changes in busbar current and the resulting magnetic flux. Therefore, this structure can more prominently achieve the effect of suppressing the spread of noise.

As described above, the configuration of (1) can suppress the spread of noise without the need to install a dedicated noise suppression component around the connection part of the busbars. Furthermore, the configurations of (2) to (6), which reference (1), each provide additional effects.

DETAILED DESCRIPTION OF THE INVENTION

Hereinafter, embodiments of the present invention will be described with reference to the drawings. However, the present invention is not limited to the following embodiments and can be implemented by modifying within a scope that does not deviate from the spirit of the present invention.

First Embodiment

Figure 1:
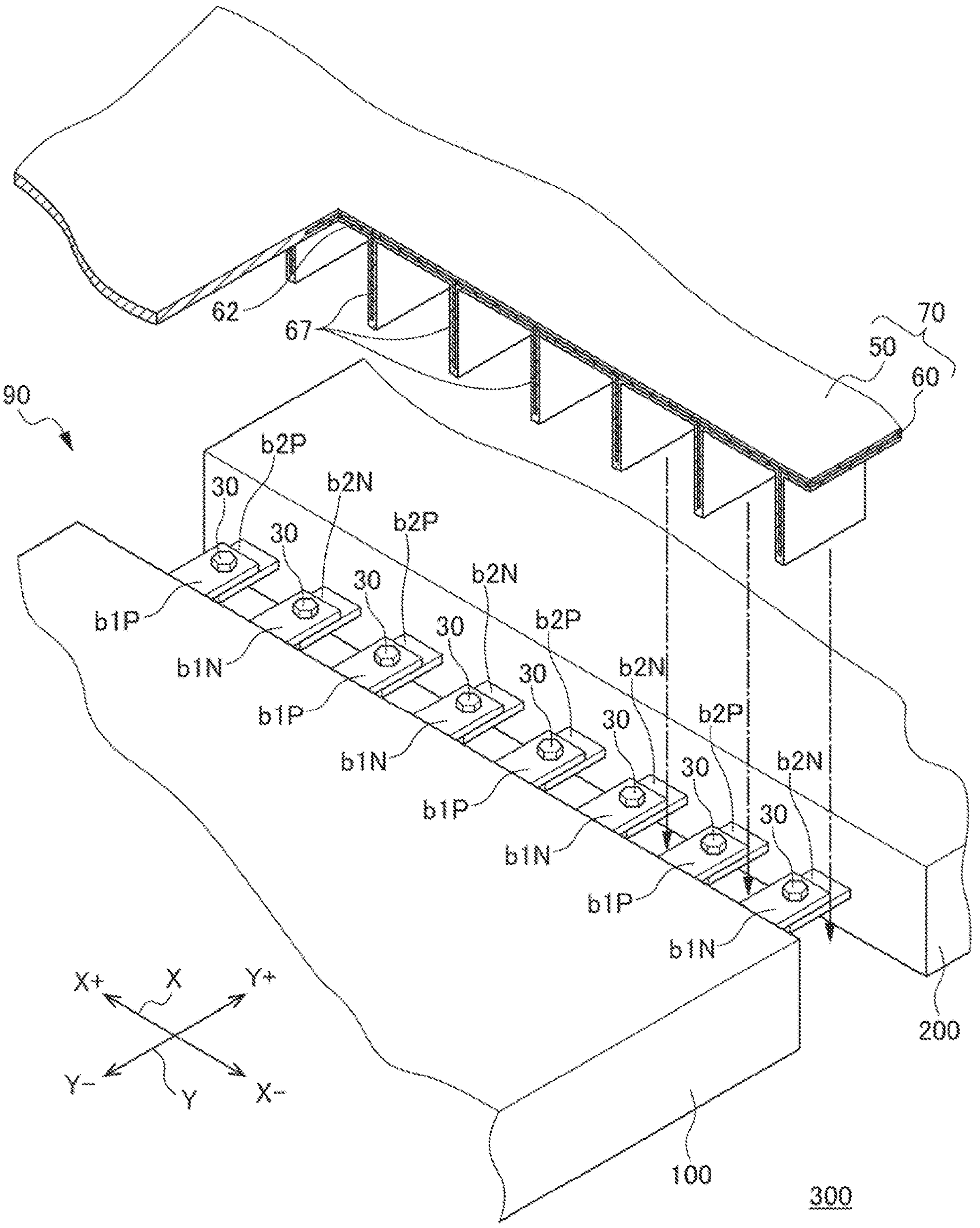
FIG. 1 is an exploded perspective view illustrating a busbar connection structure of the present embodiment.
Figure 2:
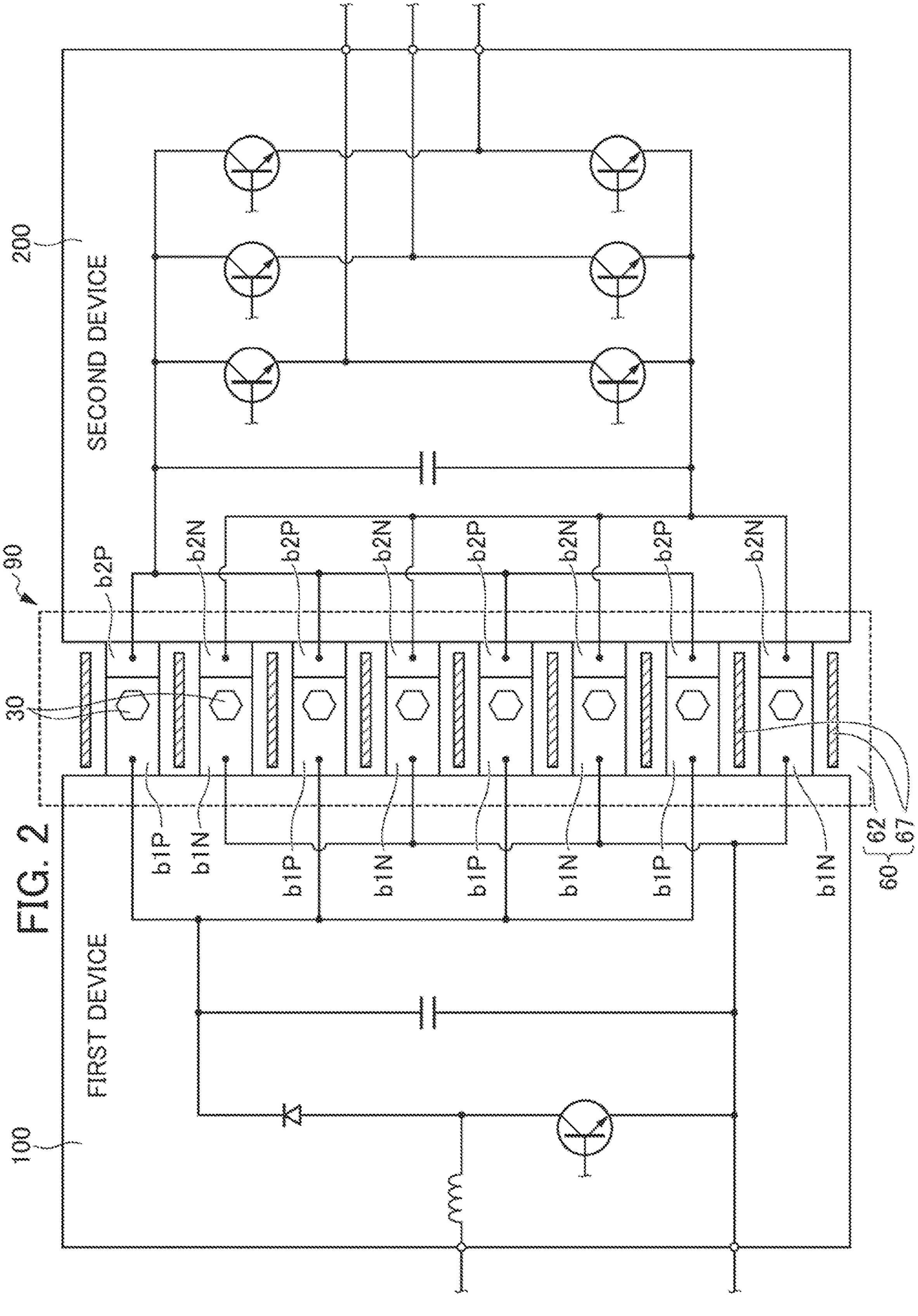
FIG. 2 is a circuit diagram illustrating a first device, the busbar connection structure, and a second device.

As illustrated in FIG. 1, a busbar connection structure 90 of the present embodiment is provided between a first device 100 and a second device 200. The first device 100 and the second device 200 are electrically connected to a body 300, such as a vehicle or equipment. The term "body" can also be interchangeably referred to as "reference potential part". In the present embodiment, as illustrated in FIG. 2, the first device 100 is a transformer such as a boost chopper, and the second device 200 is an inverter such as a three-phase AC inverter.

As illustrated in FIG. 1, three predetermined directions intersecting each other are referred to as the "X direction", "Y direction", and "up-down direction". Therefore, for example, the up-down direction does not necessarily have to be the vertical direction, and may be a direction diagonal to the vertical direction or may be a horizontal direction. Furthermore, one side in the X direction is referred to as "X+ direction" and the other side as "X− direction". Similarly, one side in the Y direction is referred to as "Y+ direction" and the other side as "Y− direction". The term "X direction" can also be interchangeably referred to as "predetermined direction".

As illustrated in FIG. 1, the first device 100 includes a plurality of first busbars b1P, b1N protruding in the Y+ direction at the end on the Y+ direction side, arranged in the X direction. On the other hand, the second device 200 includes a plurality of second busbars b2P, b2N protruding in the Y− direction at the end on the Y− direction side, arranged in the X direction, in which the second busbars b2P, b2N exist in the same number as the first busbars b1P, b1N. The first busbars b1P, b1N, and the second busbars b2P, b2N are all plate-shaped, in which the up-down direction is the direction perpendicular to the surface thereof. Hereinafter, for the first busbars b1P, b1N, the end on the Y− direction side is referred to as the "base end", and the end on the Y+ direction side as the "tip end". On the other hand, for the second busbars b2P, b2N, the end on the Y+ direction side is referred to as the "base end", and the end on the Y− direction side as the "tip end".

The first busbars b1P, b1N include a plurality of positive-side first busbars b1P and the same number of negative-side first busbars b1N. These positive-side first busbars b1P and negative-side first busbars b1N are alternately arranged in the X direction.

The second busbars b2P, b2N include a plurality of positive-side second busbars b2P and the same number of negative-side second busbars b2N. These positive-side second busbars b2P and negative-side second busbars b2N are also alternately arranged in the X direction.

As illustrated in FIG. 2, the plurality of positive-side first busbars b1P are each electrically connected to the positive-side output terminals of the circuit of the first device 100. The plurality of negative-side first busbars b1N are each electrically connected to the negative-side output terminals of the circuit of the first device 100. The plurality of positive-side second busbars b2P are each electrically connected to the positive-side input terminals of the circuit of the second device 200. The plurality of negative-side second busbars b2N are each electrically connected to the negative-side input terminals of the circuit of the second device 200.

As illustrated in FIG. 1, the busbar connection structure 90 includes a plurality of connection parts 30 and a cover 70 that covers them. For the connection parts 30, there are an equal number of the first and second busbars b1P, b1N, b2P, b2N, aligned in the X direction. Specifically, half of the connection parts 30 electrically connects the tip ends of the positive-side first busbars b1P with the corresponding tip ends of the positive-side second busbars b2P. The other half of the connection parts 30 electrically connects the tip ends of the negative-side first busbars b1N with the corresponding tip ends of the negative-side second busbars b2N.

Figure 3:
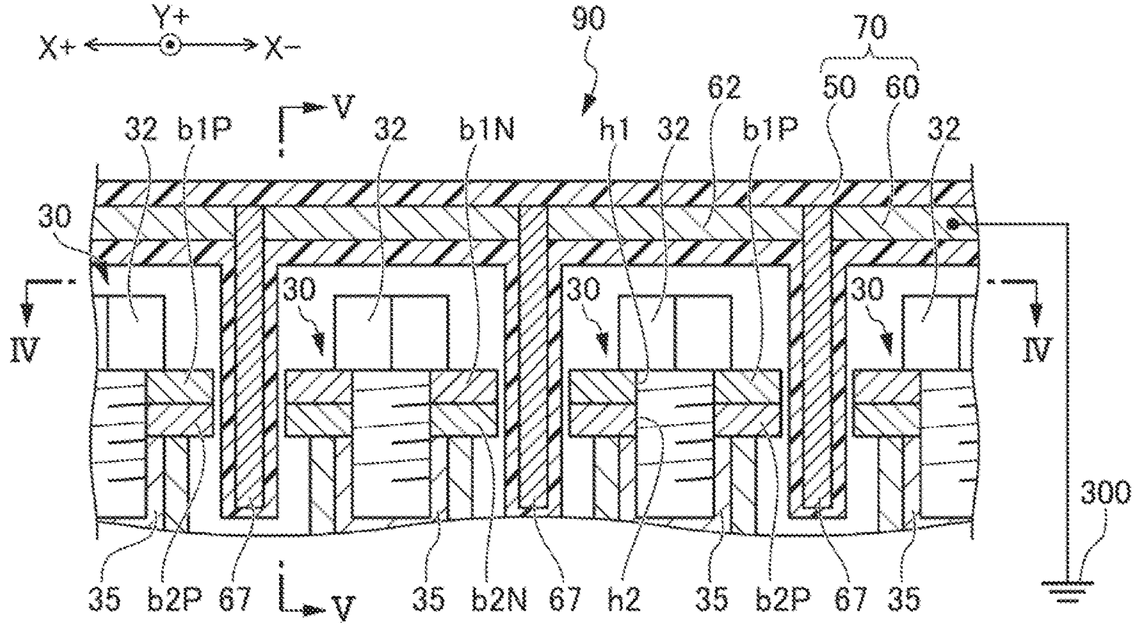
FIG. 3 is a front sectional view illustrating the busbar connection structure, more specifically, a view illustrating the section along line III-III in FIG. 4 as follows.
Figure 4:
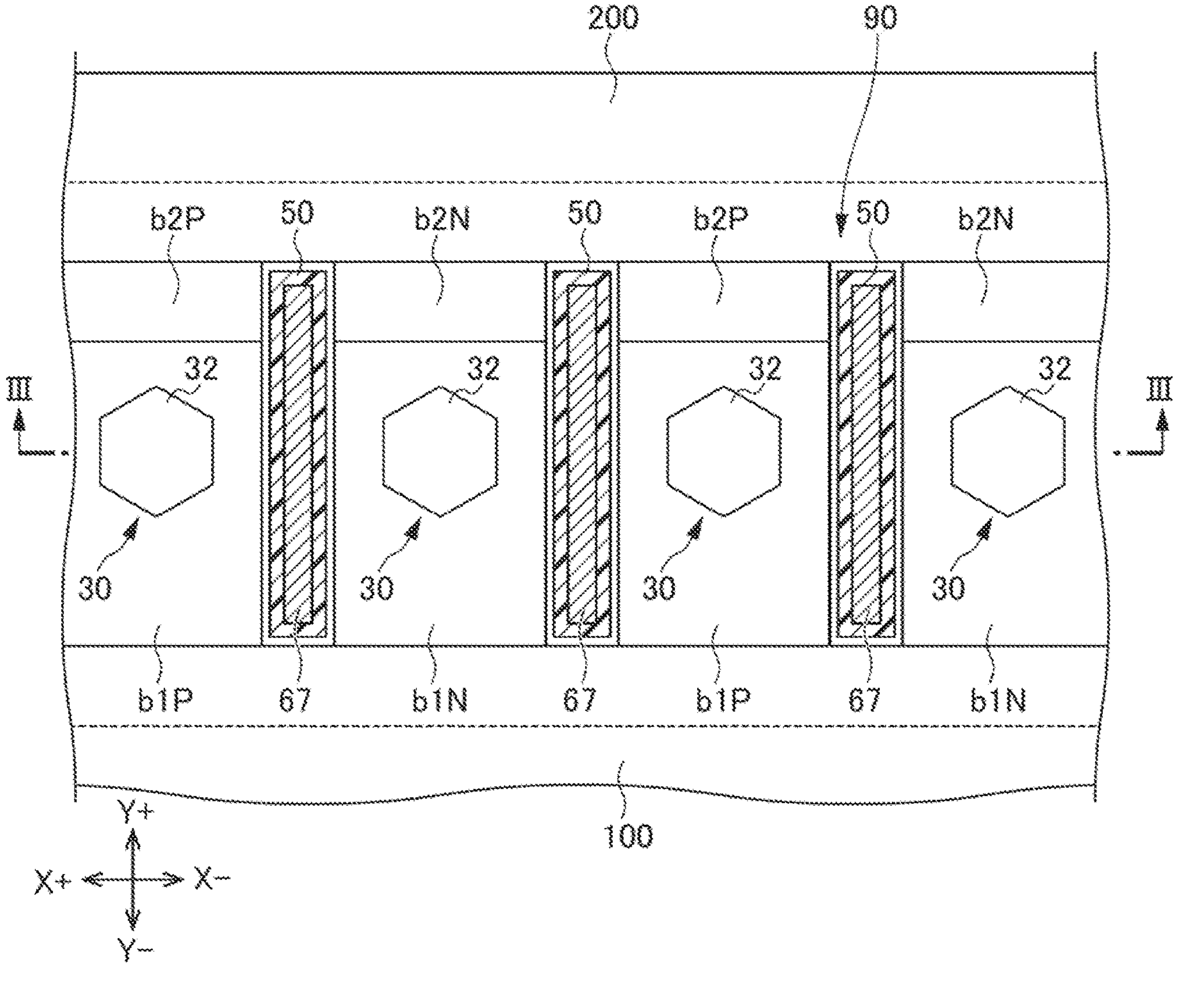
FIG. 4 is a view illustrating the section along line IV-IV in FIG. 3.
Figure 5:
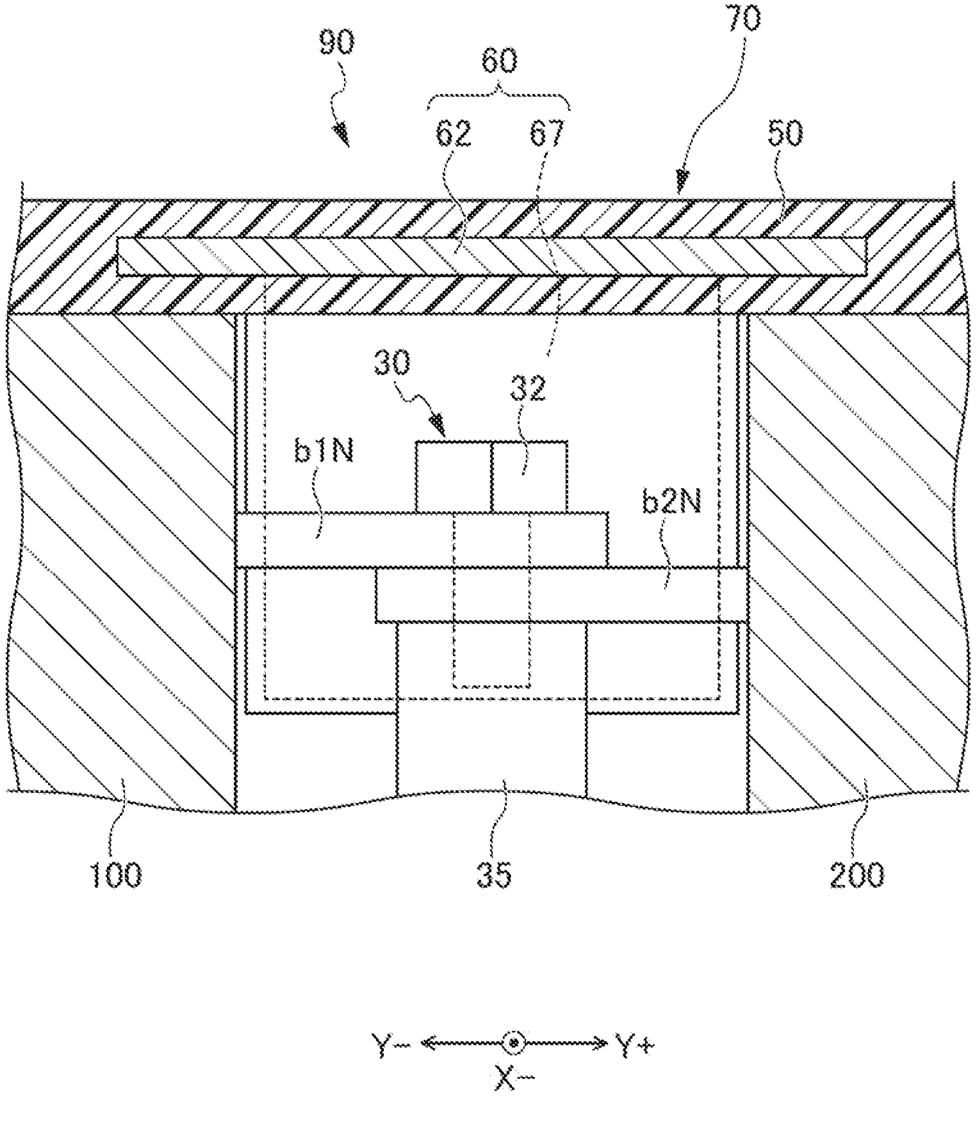
FIG. 5 is a view illustrating the section along line V-V in FIG. 3.

As illustrated in FIG. 3, each connection part 30 includes an upper end of a terminal block 35, and a bolt 32. The terminal block 35 is fastened to a body 300 or the like. Each bolt 32 fastens the tip end of the first busbars b1P, b1N and the corresponding tip end of the second busbars b2P, b2N to the upper end of the terminal block 35. As a result, the first busbars b1P, b1N and the corresponding second busbars b2P, b2N are electrically connected to each other.

Specifically, a first through-hole h1 penetrates through each tip end of the first busbars b1P, b1N, and a second through-hole h2 penetrates through each tip end of the second busbars b2P, b2N. When the tip ends of the first busbars b1P, b1N and the second busbars b2P, b2N are stacked in the up-down direction, the first through-hole h1 and the second through-hole h2 communicate with each other in the up-down direction. The bolt 32, in the state of passing through the first through-hole h1 and the second through-hole h2, is fastened to the upper end of the terminal block 35. As a result, the first busbars b1P, b1N and the corresponding second busbars b2P, b2N are fastened to the upper end of the terminal block 35.

The cover 70 as illustrated in FIG. 1 is a contamination prevention cover 70 for preventing contamination of the first busbars b1P, b1N and the second busbars b2P, b2N. The cover 70 includes a conductive part 60 and an insulation part 50 surrounding it. As illustrated in FIG. 3, the conductive part 60 is grounded by being electrically connected to the body 300 that is external to the cover 70.

As illustrated in FIG. 1, the conductive part 60 includes an upper conductive part 62 and side conductive parts 67 which are one more in number than the connection parts 30. Both the upper conductive part 62 and each of the side conductive parts 67 are conductors such as metal. The upper conductive part 62 is plate-shaped, in which the X direction is the longitudinal direction, and the Y direction is the transverse direction. Therefore, the direction perpendicular to the surface of the upper conductive part 62 is the up-down direction, aligning with the direction perpendicular to the surfaces of the first busbars b1P, b1N and the second busbars b2P, b2N. The upper conductive part 62 extends over the range including directly above each connection part 30.

Each side conductive part 67 is plate-shaped, in which the X direction is the direction perpendicular to the surface thereof. As illustrated in FIG. 3, each side conductive part 67 protrudes downward from the upper conductive part 62, extending below each of the busbars b1P, b1N, b2P, b2N. The upper end of the side conductive part 67 and the upper conductive part 62 are electrically connected to each other. Each side conductive part 67 exists not only between each of the connection parts 30 arranged in the X direction, but also on the X+ direction side of the outermost connection part 30 and on the X− direction side of the outermost connection part 30. Hence, the side conductive parts 67 exist on both sides of each connection part 30 in the X direction.

The insulation part 50 as illustrated in FIG. 1 is an insulator such as resin, and surrounds the upper conductive part 62 and the side conductive parts 67.

Figure 6:
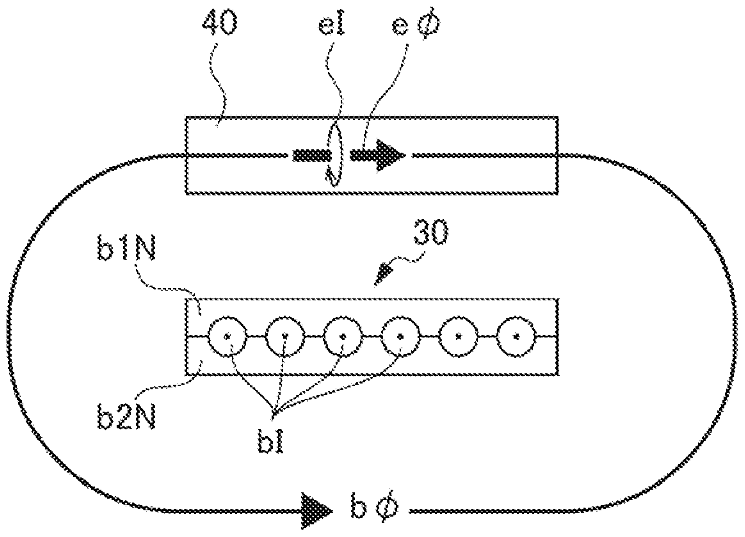
FIG. 6 is a front sectional view illustrating the busbar connection structure of the first comparative embodiment.
Figure 7:
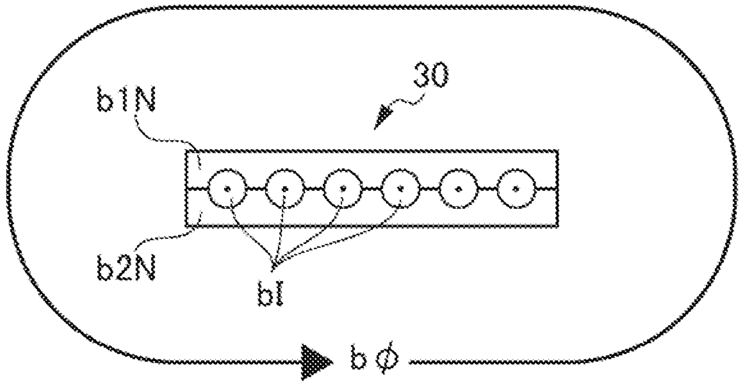
FIG. 7 is a front sectional view illustrating the busbar connection structure of the second comparative embodiment.

In a first comparative embodiment as illustrated in FIG. 6, the cover 70 is removed from the present embodiment, and parallel plates 40 are provided above the connection parts 30, in which the up-down direction is the direction perpendicular to the surface of the parallel plates 40. Moreover, in a second comparative embodiment as illustrated in FIG. 7, the cover 70 is simply removed from the present embodiment. Hereinafter, the current flowing through each of the first busbars b1P, b1N and the corresponding second busbars b2P, b2N is referred to as the "busbar current bI".

The configuration and effects of the present embodiment are summarized below in comparison with these first and second comparative embodiments.

In the first comparative embodiment as illustrated in FIG. 6, when the busbar current bI such as inrush current flows, a magnetic flux bφ is generated in the rotational direction around the direction of the busbar current bI. Based on the generation of the magnetic flux bφ, a voltage is induced in the parallel plates 40, thereby generating an eddy current eI. The magnetic flux eφ generated by the eddy current eI cancels out at least part of the magnetic flux bφ caused by the busbar current bI, thereby suppressing the generation of magnetic flux. This suppresses the spread of noise to peripheral devices.

However, in some cases, as in the second comparative embodiment illustrated in FIG. 7, it may not be possible to install parallel plates 40 above the connection parts 30. In such cases, the spread of noise cannot be suppressed.

Figure 8:
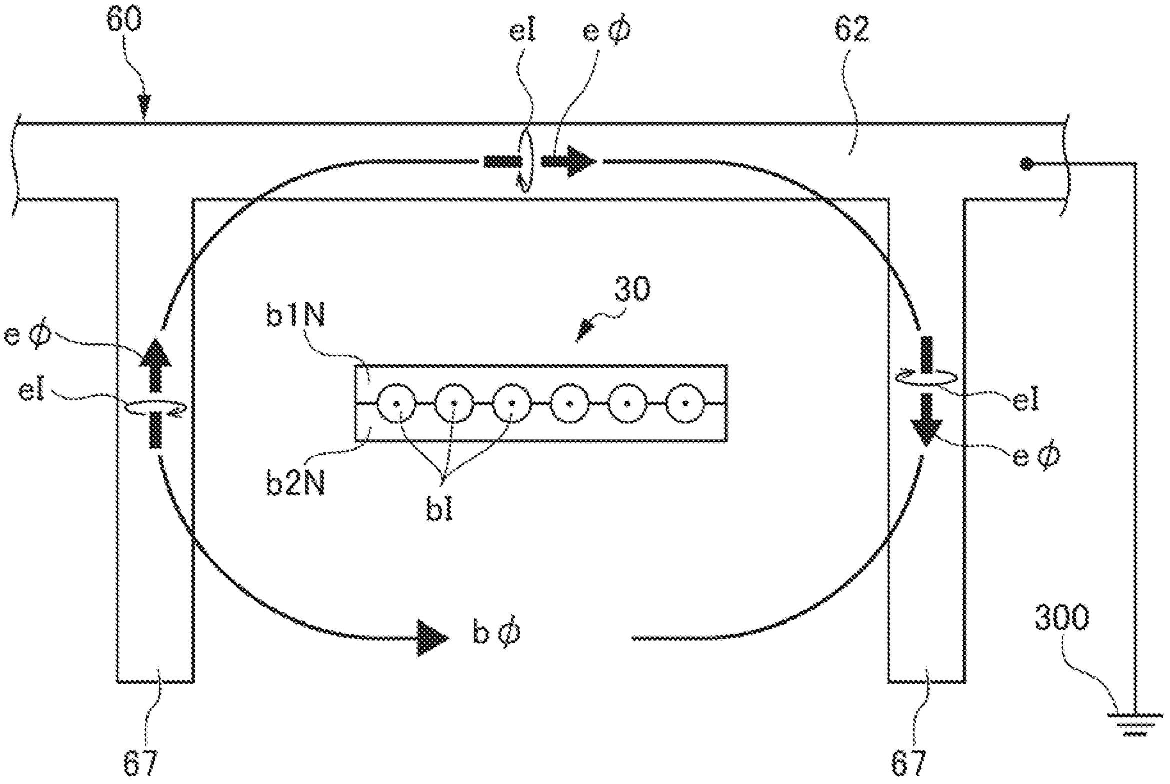
FIG. 8 is a front sectional view illustrating the busbar connection structure of the present embodiment.

In the present embodiment, as illustrated in FIG. 8, the cover 70 includes the upper conductive part 62 extending over a range including directly above the connection parts 30. Therefore, when the busbar current bI flows, the upper conductive part 62 functions similarly to the parallel plates 40, thereby suppressing the noise. As a result, the noise can be suppressed without the need for adding a dedicated noise suppression component around the connection parts 30.

Moreover, as illustrated in FIG. 8, the cover 70 not only includes the upper conductive part 62, but also the side conductive parts 67. Eddy currents eI are generated in the side conductive parts 67 as well, due to the magnetic flux bφ caused by the busbar current bI. The magnetic flux eφ generated by the eddy currents eI also cancels out part of the magnetic flux bφ caused by the busbar current bI. Therefore, the generation of magnetic flux is more robustly suppressed, and thus the spread of noise is more robustly suppressed.

The upper conductive part 62 and the side conductive parts 67 are electrically connected to each other. This connection allows magnetic flux and current to flow between the upper conductive part 62 and the side conductive parts 67, leading to an expected improvement in noise suppression effects.

As illustrated in FIG. 3, the conductive part 60 is covered by the insulation part 50. This ensures insulation between the conductive part 60 and the busbars b1P, b2P, b1N, b2N, and also ensures insulation between the busbars b1P, b2P, b1N, b2N arranged in the X direction.

The conductive part 60 is grounded by being electrically connected to the body 300. This allows current to flow between the conductive part 60 and the body 300, leading to a further expected improvement in noise suppression effects.

As illustrated in FIG. 2, the first device 100 is a transducer, and the second device 200 is an inverter. These transducers and inverters handle large currents and control semiconductor switches by duty cycle and are prone to significant changes in busbar current bI and the resulting magnetic flux bφ. Therefore, this configuration can more significantly demonstrate the effect of suppressing the spread of noise.

OTHER EMBODIMENTS

The embodiment described above can be modified, for example, in the following manner. The first device 100, which is illustrated as a single-phase boost chopper in FIG. 2, may be a three-phase boost chopper. Moreover, the first device 100 may be a transformer including a full-bridge circuit on the input side and a full-bridge circuit on the output side. Additionally, the first device 100 may be a smoothing capacitor. Also, the first device 100 may be various control devices. The second device 200, which is illustrated as a three-phase AC inverter in FIG. 2, may be a two-phase AC inverter. Furthermore, the second device 200 may be a DC motor or various control devices.

EXPLANATION OF REFERENCE NUMERALS

30: connection part
50: insulation part
60: conductive part
62: upper conductive part
67: side conductive part
70: contamination prevention cover
90: busbar connection structure
100: first device
200: second device
300: body
b1P: positive-side first busbar
b1N: negative-side first busbar
b2P: positive-side second busbar
b2N: negative-side second busbar

What is claimed is:

1. A busbar connection structure, comprising:

a connection part that electrically connects a first busbar that is electrically connected to a circuit of a first device, and a second busbar that is electrically connected to a circuit of a second device; and a cover for preventing contamination, covering a range including the connection part, wherein the cover includes a conductive part as a region of a conductor, at least over a range including directly above the connection part, and wherein the conductive part is grounded by being electrically connected to a reference potential part that is external to the cover.

2. The busbar connection structure according to claim 1, wherein the first busbar and the second busbar exist in a plurality of numbers, and the connection parts are aligned in a predetermined direction, and the cover includes, as the conductive part, an upper conductive part over a range including directly above the connection parts, and side conductive parts over ranges including both sides sandwiching the connection parts in the predetermined direction.

3. The busbar connection structure according to claim 2, wherein the side conductive parts protrude downward from the upper conductive part, and the upper conductive part and the side conductive parts are electrically connected to each other.

4. The busbar connection structure according to claim 2, wherein the upper conductive part and the side conductive parts are each covered with an insulator.

5. The busbar connection structure according to claim 3, wherein the upper conductive part and the side conductive parts are each covered with an insulator.

6. The busbar connection structure according to claim 1, wherein at least one of the first device and the second device is a transformer or an inverter.

7. A busbar connection structure, comprising:

a connection part that electrically connects a first busbar that is electrically connected to a circuit of a first device, and a second busbar that is electrically connected to a circuit of a second device; and a cover for preventing contamination, covering a range including the connection part, wherein the cover includes a conductive part as a region of a conductor, at least over a range including directly above the connection part, wherein the first busbar and the second busbar exist in a plurality of numbers, and the connection parts are aligned in a predetermined direction, and wherein the cover includes, as the conductive part, an upper conductive part over a range including directly above the connection parts, and side conductive parts over ranges including both sides sandwiching the connection parts in the predetermined direction.

8. The busbar connection structure according to claim 7, wherein the side conductive parts protrude downward from the upper conductive part, and the upper conductive part and the side conductive parts are electrically connected to each other.

9. The busbar connection structure according to claim 7, wherein the upper conductive part and the side conductive parts are each covered with an insulator.

10. The busbar connection structure according to claim 8, wherein the upper conductive part and the side conductive parts are each covered with an insulator.

11. The busbar connection structure according to claim 7, wherein at least one of the first device and the second device is a transformer or an inverter.

* * * * *